United States Patent Office 3,782,994
Patented Jan. 1, 1974

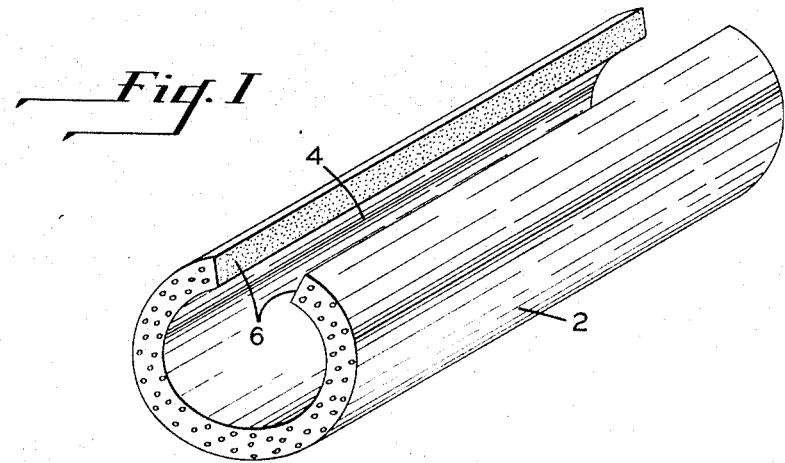
Fig. I
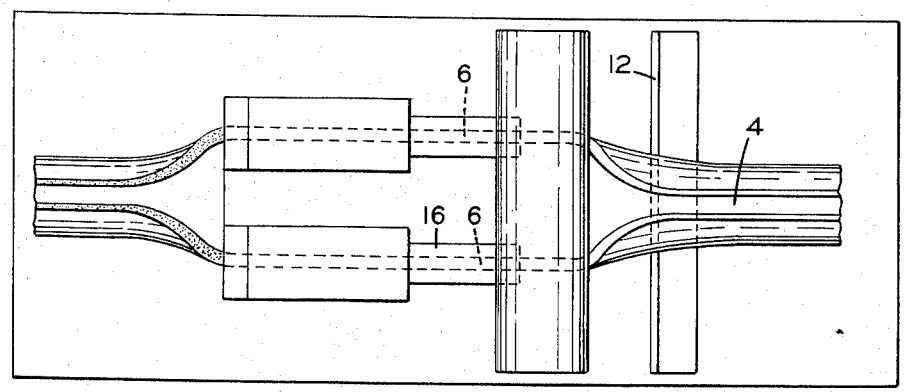
Fig. II
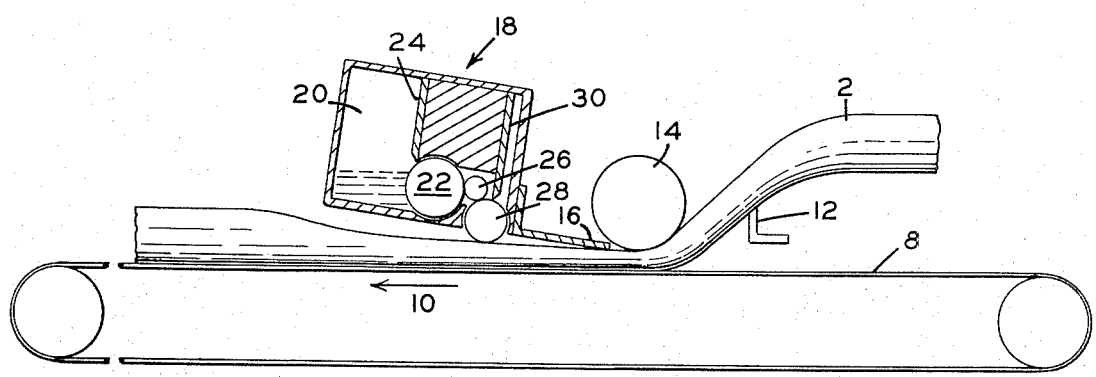
Fig. III
INVENTOR
JOHN J. DOHERTY
BY Clifford B. Price
ATTORNEY

3,782,994
METHOD FOR APPLYING ADHESIVE TO THE EDGES OF A SLIT TUBE
John J. Doherty, Braintree, Mass., assignor to Armstrong Cork Company, Lancaster, Pa.
Filed May 13, 1971, Ser. No. 143,119
Int. Cl. B41k 3/68
U.S. Cl. 117—4
1 Claim

ABSTRACT OF THE DISCLOSURE

Foamed tubular insulation is provided with a slit down its longitudinal length so that it may be slid over a pipe. The apparatus herein opens up the tubing so that an adhesive coater may apply an adhesive to both edges of the slit in the tubing. A flattening structures opens up the tube so that the two surfaces to be coated are in the same horizontal plane and a roll coating structure then applies adhesive to the two edges in the same plane. The adhesive is permitted to dry and is then later solvent actuated when it is to be utilized to fasten the two edges together.

BACKGROUND OF THE INVENTION

Field of the invention

The invenion is directed to a coating apparatus and, more specifically, to an apparatus for positioning the edges of a slit in a tube for coating.

Description of the prior art

Foamed tubular insulation has been available for a number of years. Initially, it was slid over the pipes before the pipes were fastened together. It then developed that the tubing would be slit longitudinally and then slid over the piping after it was assembled together. An adhesive coating would then be painted on the edges of the slit and the two edges forced together to bond them. Naturally, the glue that was utilized would be sticky and would ofttimes get on the hands of the individuals who were installing the tubing. They would then have the problem of handling additional lengths of tubing with sticky hands. It therefore developed that it would be convenient to have a precoated adhesive on the edge of the tubing so that the installer of the tubing need only push the two edges together to fasten them together. However, normal pressure-sensitive adhesives could not readily be used because the tubing is packed in boxes and there would be a tendency for the edges to inadvertently adhere together prior to the time they were installed on the pipe. Therefore, a solvent actuated adhesive was used, and all the installer need do now is apply a solvent to the edges of the tubing to actuate the adhesive and then push the edges together. The solvent itself would not be sticky and the adhesive would not ooze out around the seam in the tubing and get on the hands of the installer. Consequently, the tubing is easier to handle and is installed in a much faster manner.

The idea of coating material with an adhesive is relatively old. Also, the use of solvent actuated adhesives is old. However, to date no one has developed a technique for applying adhesive to the edges of a slit tubing. The invention herein is a very specific solution to a very specific problem.

SUMMARY OF THE INVENTION

The invention relates to a method and means for applying adhesive to the edges of a longitudinal slit in a hollow expanded foamed tubing of the type used for insulating pipes. In particular, the apparatus consists of a belt conveyer and an adjustable feed roll which cooperate to advance the tubular insulation to a coating station. The feed roll opens the tube along the slit and flattens it to a "U-shaped" form, wherein the edges to be coated with adhesive lie in a common horizontal plane at the top of the "U." In this configuration, the tube is passed under holding shoes and an adhesive-applying apparatus. The speed of the adhesive application structure with respect to the motion of the tube determines the thickness of the coating of adhesive. The tube is then released and allowed to return to its original shape. The adhesive is a fast drying adhesive and it dries before the insulation has returned to its original shape. The adhesive is reactuated by an appropriate solvent on the job site, and the slit can thus be joined together by use of finger pressure, forcing the two adhesive coated edges together.

BRIEF DESCRIPTION OF THE DRAWING

FIG. I of the drawing is an isometric cross-sectional view of the tubing to be coated;
FIG. II is a top view of the coating apparatus; and
FIG. III is a side view of the coating apparatus.

DESCRIPTION OF THE PREFERRED EMBODIMENT

The tubular, cellular pipe insulation 2 which is adhesive-coated herein is of the type described in U.S. Pat. No. 2,849,028, which issued Aug. 26, 1958. FIG. I shows this type tube is a cross-sectional view with the longitudinal slit 4 therein. The longitudinal slit is used to permit the tubing to be slid over a pipe. If the adhesive would be applied to the edges 6 of the longitudinal slit, these edges could be pushed together, and the adhesive would hold the edges together. Normally, the pipe covering in its relaxed state would have the two edges much closer together than is shown in the FIG. I representation. Therefore, if a pressure-sensitive adhesive had been used, there would be a good chance that these two edges would bond together when the tube is placed in a packing box. Consequently, a conventional solvent-actuated adhesive is utilized to coat the edges 6 so that they can be bonded together.

FIGS. II and III show the equipment which is utilized to spread apart the edges of the tube so that adhesive may be applied to the surfaces 6. The conveyor belt 8 passes around appropriate roll structures and moves the tube 2 in the direction of the arrow 10. The tube 2 as it approaches the fixed bar 12 is in its generally closed position as shown in FIG. I. As the tube passes over the fixed bar 12, the slit 4 faces upwardly away from the bar 12. Immediately after passing over the bar 12, the tube drops down and passes under an adjustable power driven feed roll 14. The space between the feed roll 14 and the conveyer belt 8 is substantially less than the diameter of the tube. The combination action of the roller 14 and fixed bar 12 manually open up the tube along the slit to form it into a generally "U" shape. As seen in FIG. II, the edges 6 of the tube are now facing upwardly and are in a common plane which is parallel with the plane of the conveyer belt. Small plates or holding shoes 16 hold the opened tubing in position with the two edges 6 in the common plane. The tubing then passes under a roll coater which applies adhesive to the surfaces 6. The roll coater assembly 18 is composed of a reservoir 20 which contains the appropriate adhesive. A roller 22 picks up the adhesive from the reservoir, and a doctor blade 24 controls the amount of adhesive picked up by the roller 22. The roller 22 passes the adhesive to a roller 26 which then passes the adhesive to the applicator roll 28. A doctor blade 30 controls the thickness of the adhesive on the application roller 28. The application roller 28 applies the adhesive to the surfaces 6. Two rollers are used to apply the adhesive to the two surfaces 6. It would be possible to use a single roll coater to accomplish this same application step. The adhesive dries rather rapidly to a nontacky state such that if the two edges would be pushed together, they would not bond together. As the tube passes out from under the roll coater, the restraining forces which were holding the tube in its "U" shape are released. The natural resiliency of the slit tube causes the flattened tube to slowly close again.

By making the rollers of the roll coater power driven and by providing a variable speed drive for these coating rollers, it is possible to change the surface speed of the applicator rolls relative to the speed of the slit tube and thus apply different film thicknesses of the adhesive to the surfaces 6.

What is claimed is:

1. The method of applying an adhesive to the edges of a slit in a tube wherein a tubular structure is provided with a slit down its longitudinal length and it is desirable to apply an adhesive to the edges of the slit so that the edges of the slit may be subsequently joined together, the steps comprising feeding the tube with the longitudinal slit along a conveyer with the slit facing upward away from the conveyer, passing the tubing under a structure which is spaced from the conveyer belt by a distance less than the diameter of the tubing to force the tubing from its round configuration to a "U-shaped" configuration with the edges of the slit in a common plane, holding the edges of the slit in a common plane parallel to the surface of the conveyer belt, applying an adhesive to the edges of the slit, and then permitting the adhesive to dry before the tube returns to its normal round configuration.

References Cited
UNITED STATES PATENTS

| | | | |
|---|---|---|---|
| 2,717,848 | 9/1955 | Jaye | 138—Dig. 5 |
| 3,191,632 | 6/1965 | Keiding | 138—156 X |
| 2,857,931 | 10/1958 | Lawton | 138—149 X |
| 3,489,183 | 1/1970 | Eberle | 138—156 |

WILLIAM D. MARTIN, Primary Examiner

T. G. DAVIS, Assistant Examiner

U.S. Cl. X.R.

117—43, 47 R, 94, 111 R